June 2, 1964   HUGH L. DRYDEN   3,135,089
DEPUTY ADMINISTRATOR OF THE NATIONAL
AERONAUTICS AND SPACE ADMINISTRATION
DECOMPOSITION UNIT
Filed Sept. 29, 1961
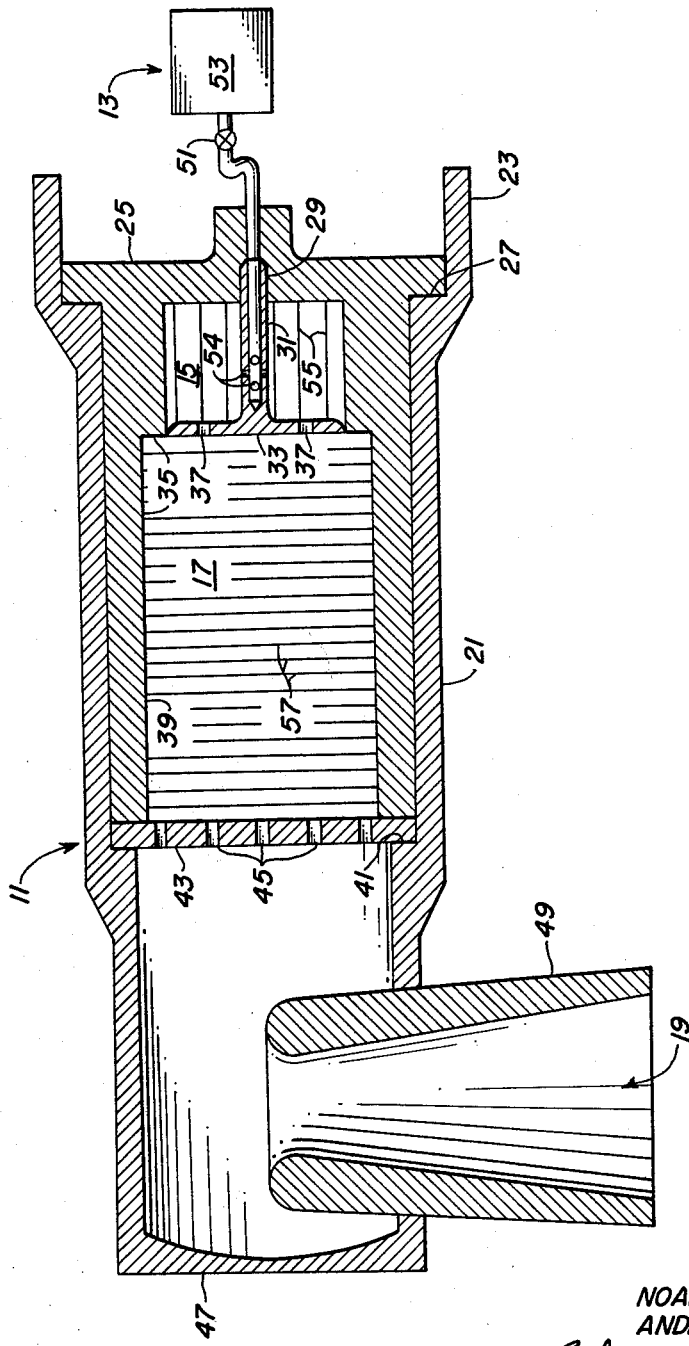
INVENTORS
NOAH S. DAVIS
ANDREW J. KUBICA
BY
ATTORNEYS

United States Patent Office 3,135,089
Patented June 2, 1964

3,135,089
DECOMPOSITION UNIT
Hugh L. Dryden, Deputy Administrator of the National Aeronautics and Space Administration, 1520 H St. NW., Washington 25, D.C., with respect to an invention of Andrew J. Kubica and Noah S. Davis
Filed Sept. 29, 1961, Ser. No. 182,699
7 Claims. (Cl. 60—35.6)

The invention described herein may be manufactured and used by or for the Government of the United States of America for governmental purposes without the payment of any royalties thereon or therefor.

This invention relates generally to catalyst bed decomposition units, and more particularly to reaction devices utilizing catalytically decomposed hydrogen peroxide for thrust generation.

Among the essential elements of many space vehicles or high altitude aircraft are a number of small reaction engines for controlling vehicle attitude in the pitch, roll, and yaw planes. In view of the total weight and volume limitations of present day vehicles of these types, it is desirable that reaction engines for attitude control be both lightweight and compact. It is a further requirement of such devices that they be capable of generating full thrust reliably and repeatedly very shortly after actuation.

It is well known that hydrogen peroxide decomposes readily into superheated steam and oxygen when passed over any one of various catalytic agents. Accordingly, catalytic bed decomposition units with hydrogen peroxide fuel have been utilized extensively for small thrust generating control engines. However, at environmental temperatures of 40° Fahrenheit and below, it has been found that a substantial lag time exists between the initial contact of the hydrogen peroxide with the catalyst bed and the attainment of the full thrust capabilities of the engine. This delay in reaching full thrust, which can render such devices useless for attitude control of high velocity vehicles, is accentuated by repeated "on-off" use of the engine. The aforementioned conventional thrust engines have consisted essentially of a hydrogen peroxide feed line, a decomposition chamber enclosing a catalyst bed, and an outlet nozzle, wherein fuel flow progressed directly across the bed towards the nozzle.

Since severe weight and power penalties are attendant to the provision of means to maintain the chamber and hydrogen peroxide fuel supply at temperatures above 40° Fahrenheit, a need has arisen for such an engine capable of reliable rapid attainment of full thrust at lower temperatures.

Accordingly, it is an object of this invention to provide a new and improved unit for the catalytic decomposition of hydrogen peroxide.

Another object of the present invention is the provision of a lightweight, compact thrust engine.

A further object of the instant invention is to provide a decomposition unit capable of reliably and rapidly attaining full decomposition of hydrogen peroxide introduced thereinto.

An additional object of this invention is the provision of a simple, rugged and economical thrust engine of a reliable nature.

According to the present invention, the foregoing and other objects are attained by providing an elongated decomposition unit having means for introducing hydrogen peroxide at one end thereof, means arranged to cause the hydrogen peroxide to travel transversely across a first chamber through a first catalyst bed and to trap a portion thereof in contact with the bed, and means to then channel the hydrogen peroxide longitudinally along a second chamber through a second catalyst bed and towards an outlet at the other end of the unit.

A more complete appreciation of this invention and of many of the attendant advantages thereof will be readily gained as the same becomes better understood by reference to the following detailed description and accompanying drawing wherein:

The figure is a side elevational view, partially in section and partially schematic, of the hydrogen peroxide decomposition unit according to this invention.

In the embodiment chosen for illustrative purposes and shown in the drawing, a thrust unit, generally designated by reference numeral 11, comprises essentially the following functional components: (1) hydrogen peroxide fuel supply system 13; (2) first generally cylindrical decomposition chamber 15; (3) second generally cylindrical decomposition chamber 17; and (4) outlet means 19, all to be more specifically described hereinafter.

Thrust unit 11 includes frame 21, preferably of generally elongate cylindrical form, having a first end portion 23 defined by generally cup-shaped bulkhead 25 conforming to the internal shape of frame 21, and abutting and affixed to internal shoulder 27 thereof. As is the case with all of the structural connections to be described hereinafter, the interconnection of bulkhead 25 to frame 21 may be accomplished in any conventional manner, such, for example, as welding or machine bolts, not shown.

Mounted in bulk head 25 is an inlet means 29 comprising tube 31 extending along the longitudinal axis of unit 11 and a manifold plate 33 conforming to the internal shape of bulkhead 25. As shown in the drawing, plate 33 abuts the interior wall 35 of bulkhead 25 in sealing relationship, and has a plurality of apertures 37 formed therein. Accordingly, a first decomposition chamber 15 is formed between bulkhead 25 and manifold plate 33.

Mounted between annular end 39 of bulkhead 25 and an internal shoulder 41 on frame 21 is a distributor plate 43 having apertures 45 formed therein, thus forming second decomposition chamber 17, closed save for apertures 45 and 37. Suitably affixed to outlet end 47 of frame 21 may be a conventional converging-diverging nozzle 49, constituting an outlet means 19 for the decomposition unit.

Communicating with tube 31 through conventional valve means 51 is a supply container 53 of hydrogen peroxide. A plurality of radially directed orifices 54 formed in tube 31 permit radial dispersion of hydrogen peroxide (from container 53) within first decomposition chamber 15 whenever valve means 51 is actuated to the "open" position. Valve means 51 may include a conventional solenoid valve, controlled, for example, by a vehicle roll detector, not shown. In such a case, nozzle 49 could be so positioned on the vehicle as to correct roll in a given direction.

Positioned within chamber 15 is a wire mesh screen rolled around tube 31 into the form of a scroll, schematically illustrated by lines 55. This screen 55 is formed of a catalytic material capable of aiding the decomposition of hydrogen peroxide. Among suitable materials for this catalytic function are silver and platinum. A preferred material is samarium nitrate-treated silver, which has excellent properties as a catalyst in this role, forms readily into wire, and has excellent heat transferal properties, an advantage discussed further hereinafter.

As a specific example of screen construction a 0.014 inch radius wire woven into 20 x 20 per inch mesh has been found to work quite well in a unit, the overall diameter of which (i.e., of frame 21) is approximately two inches.

Within second chamber 17 there are rigidly mounted a series of screens 57, illustrated somewhat schematically, which may be of wire mesh identical to catalyst screen 55. The number of screens 57 is not critical, but 20 or more may be used. Each screen 57 is mounted to extend transversely across chamber 17, and the screens are arranged longitudinally serially along the chamber, as indicated in the drawing.

The operation of the unit should be obvious to those skilled in the art from a reading of the foregoing detailed description, but for purposes of clarity and in order to reiterate the inventive features of the device, a statement of operation will now be given.

Whenever supply container 53 has hydrogen peroxide stored therein, and valve means 51 is actuated to the open position, hydrogen peroxide will flow into inlet means 29 and thence through orifices 54 in tube 31. Because of the positioning of orifices 54, the hydrogen peroxide emerging therefrom will be directed radially outwardly towards the outer extremities of first decomposition chamber 15.

Now, in the conventional unit of this type, wherein the hydrogen peroxide is allowed to pass straight through the catalyst bed to the outlet, when temperatures are relatively low the hydrogen peroxide is not in contact with the catalyst for a sufficient length of time for full decomposition to take place.

However, the present invention overcomes this shortcoming of the prior art. By directing the hydrogen peroxide radially in the first decomposition chamber, it is possible to create an area of substantially stagnant, or "dead-ended" fuel at the upstream end of scroll screen 55, adjacent bulkhead 25, as the succeeding flow passes through the screen and out apertures 37. This stagnant hydrogen peroxide remains in contact with the catalyst screen for a sufficient period to decompose. The heat of decomposition increases the local temperature, and then, due to the thermal conductivity of the wire screen, heats the entire chamber. This process is accelerated if the samarium nitrate-treated silver, aforementioned, is utilized, silver being a good conductor of heat.

As first chamber 15 becomes heated, more and more of the hydrogen peroxide entering is decomposed, giving off more heat. Accordingly, the chamber begins to serve as a "pre-heater," serving to warm that portion of the flow which is not decomposed, and, thus aiding decomposition in second chamber 17, as the flow progresses through bed 57.

Finally, the decomposed hydrogen peroxide, now in the form of superheated steam and oxygen, passes through distributor plate 43 to nozzle 49, thus generating thrust.

Thus it can be readily seen that it is the substantial stagnation, or "dead-ending," of a portion of the flow in a portion of a first chamber, and utilizing the heat of decomposition of the stagnant hydrogen peroxide to raise the temperature of the chamber, which provides the improved performance attendant to the present invention.

While the exact flow rate for fuel through supply system 13 may be chosen for specific applications, a "bed-loading factor," or ratio of pounds of propellant flow per minute to the cross-sectional area of the catalyst bed in square inches, of approximately 10 has been found to give good results.

It is to be understood that suitable seal rings, packings and the like may be utilized to prevent leakage around the various structural jointures hereinbefore mentioned. The size of unit 11 may vary in particular applications, but units having overall diameters of less than two inches may be constructed.

Obviously many modifications and variations of the present invention are possible in the light of the above teachings. It is therefore to be understood that, within the scope of the appended claims, the invention may be practiced other than as specifically described.

What is claimed as new and desired to be secured by Letters Patent of the United States is:

1. An elongate hydrogen peroxide decomposition unit for generating thrust, comprising means defining first and second decomposition chambers arranged longitudinally within said unit, radially directed inlet means for introducing hydrogen peroxide transversely of said unit within said first decomposition chamber, manifold aperture means for establishing longitudinal communication between said first and second decomposition chambers, outlet means communicating with said second decomposition chamber for allowing the decomposed hydrogen peroxide to leave the chamber thus providing thrust, and first and second wire mesh catalyst bed means disposed within each of said first and second decomposition chambers said first wire mesh catalyst bed means disposed in scroll-like form about the radially directed recesses in order to effectively receive the radially directed flow of hydrogen peroxide.

2. The elongate hydrogen peroxide decomposition unit set forth in claim 1, wherein said wire mesh scroll is radially disposed with its geometric center substantially coincident with the longitudinal axis of said unit, and said catalyst bed means disposed in said second decomposition chamber comprises a plurality of flat sheets of metallic wire mesh each extending transversely of said unit and being arranged longitudinally serially in said second chamber.

3. The elongate hydrogen peroxide decomposition unit set forth in claim 1, wherein said outlet means comprises a nozzle mounted adjacent one end of said unit.

4. A device for generating thrust by catalytically decomposing hydrogen peroxide and exhausting the products of decomposition thereof through a nozzle, comprising: a generally cylindrical decomposition unit; a bulkhead closing one end of said unit; hydrogen peroxide supply container means; valved means communicating with said supply means; inlet means communicating with said valved means, said inlet means comprising inlet tube means extending through said bulkhead and longitudinally within said unit, and manifold plate means mounted on said inlet tube means and extending transversely across said unit, said manifold plate means and bulkhead forming a first generally cylindrical chamber therebetween; there being a plurality of radially directed orifices in said inlet tube, whereby hydrogen peroxide flowing from said supply container through said valved means to said inlet means is dispersed radially within said first decomposition chamber; a distributor plate mounted within said unit and spaced longitudinally from said manifold plate, thus forming a second decomposition chamber; means forming apertures in said manifold plate, providing longitudinal communication between said first and second decomposition chambers; means forming apertures in said distributor plate for exhaust from said second decomposition chamber; a converging-diverging nozzle mounted adjacent the end of said unit opposite the aforementioned end; and first and second catalyst bed means disposed within said first and second decomposition chambers said first catalyst bed means formed of a scroll-shaped wire mesh screening which is disposed about said radially directed orifice of said inlet tube and which is chemically activated upon contact with the radially dispersed hydrogen peroxide.

5. The device as set forth in claim 4, wherein said wire mesh screen is treated with samarium nitrate.

6. An elongate hydrogen peroxide decomposition unit comprising: a bulkhead having a recess therein and a manifold sealing said recess and forming a first preheat decomposition chamber extending longitudinally within said unit, inlet means within said first preheat decomposition chamber for introducing hydrogen peroxide transversely of said unit comprising an inlet tube extending longitudinally within said unit, said inlet tube having a plurality of radially directed orifices; a second decomposition chamber extending longitudinally within said unit, said manifold having means for establishing fluid communication between said first and second decomposition chambers, outlet means communicating with said second decomposition chamber, and first and second wire mesh catalyst bed means disposed respectively within each of said first and second decomposition chambers, said first wire mesh catalyst bed means formed in a scroll-like shape and disposed around the longitudinal axis of the unit so as to evenly receive the hydrogen peroxide from said radially directed recesses and thus preheat said first decomposition chamber.

7. An elongate hydrogen peroxide decomposition unit, comprising means defining first and second decomposition chambers arranged longitudinally within said unit, inlet means for introducing hydrogen peroxide transversely of said unit within said first decomposition chamber, manifold means for establishing longitudinal communication between said first and second decomposition chambers, outlet means communicating with said second decomposition chamber, and wire mesh catalyst bed means disposed within each of said first and second decomposition chambers, said wire mesh catalyst bed means formed of samarium nitrate-treated silver.

References Cited in the file of this patent
UNITED STATES PATENTS

| | | |
|---|---|---|
| 2,648,190 | Maisner | Aug. 11, 1953 |
| 2,721,788 | Schad | Oct. 25, 1955 |
| 2,865,721 | Lane et al. | Dec. 23, 1958 |
| 2,887,456 | Halford et al. | May 19, 1959 |
| 2,930,184 | Plescia et al. | Mar. 29, 1960 |
| 3,091,520 | Newburn | May 28, 1963 |